(No Model.)
L. O. GILLILAND.
ROLLER BEARING FOR SHAFTING.
No. 568,898. Patented Oct. 6, 1896.
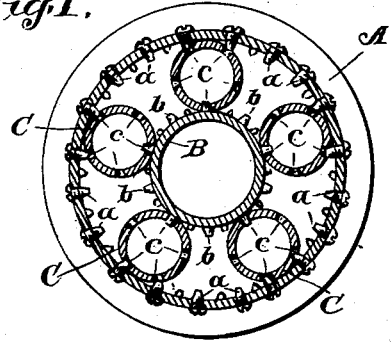
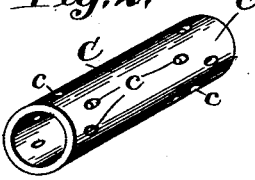

UNITED STATES PATENT OFFICE.

LEE O. GILLILAND, OF CHICAGO, ILLINOIS, ASSIGNOR OF FIVE-NINTHS TO CYRENIUS A. DAVID AND WILLIAM S. SHARPNECK, OF SAME PLACE.

ROLLER-BEARING FOR SHAFTING.

SPECIFICATION forming part of Letters Patent No. 568,898, dated October 6, 1896.

Application filed December 23, 1895. Serial No. 573,029. (No model.)

*To all whom it may concern:*

Be it known that I, LEE O. GILLILAND, of Chicago, in the State of Illinois, have invented certain new and useful Improvements in Roller-Bearings for Shafting, of which the following is a specification.

My invention relates generally to roller-bearings for shafting; and the object of my improvements is to provide means for supporting the rollers apart from one another in action and preventing such displacement as might cause the rollers to come in contact or shift longitudinally. I attain this object by the means illustrated in the accompanying drawings, in which—

Figure 1 is a cross-section near one end of the hub and shaft of a bicycle provided with a roller-bearing embodying my invention. Fig. 2 is a detail showing a perspective view of one of the rollers detached.

In the drawings, A designates the hub, B the shaft, and C the rollers, the shaft being fixed and the hub revoluble, and the shaft and rollers being made of tubing in order to reduce their weight.

The interior of the hub A or journal-box is provided near its ends with two or more rows of projections $a$, which are preferably semiglobular in form. These are best made and secured in position by being applied from the exterior and threaded in openings through the walls of the box, as shown in the drawings. The exterior of the shaft B or journal is also provided with two rows of projections $b$ of similar form to the projections $a$ of the box and severally occupying positions on the shaft opposite to the positions of the projections $a$.

The rollers are provided with two or more rows of depressions or recesses $c$, which are severally formed and positioned to correspond with the projections $a$ $b$ of the box and shaft or journal.

It should be observed that the several depressions or recesses $c$ and the projections $a$ and $b$ are placed on a spiral or twist to the axis of rotation, the object being to use a large recess and projection in order to have less pitch to the circle; and it will be seen that by increasing the number of rows of recesses and projections the size of the recesses and projections can be increased and their pitch relatively to the circle lessened.

It is essential that a portion of the projections on the shaft or box be detachable or adustable, so as to be removed or got sufficiently out of place to assemble the rollers and shaft in the box. When assembled and all the projections are in place, the rollers are thereby held in position, so as to revolve freely and carry the shaft without liability to displacement, which might cause them to come into contact with one another or shift longitudinally.

It is obvious that the projections might be put upon the rollers and the depressions in the box and journal to produce the same result.

Having thus fully described my invention, what I claim, and desire to secure by Letters Patent, is—

In a roller-bearing the combination, of a box, journal, and rollers having cylindrical bearing-surfaces and a series of projections and depressions placed in separate rows and arranged upon a spiral or twist, said several projections and depressions being in coincident radial position upon the several bearing-surfaces, as specified.

LEE O. GILLILAND.

Witnesses:
ANNIE M. ADAMS,
ELLIS LEVY.